(12) United States Patent
Kuker (10) Patent No.: US 8,727,084 B1
(45) Date of Patent: May 20, 2014

(54) TAKE-UP REEL ASSEMBLY

(76) Inventor: David J Kuker, Spirit Lake, IA (US)

( * ) Notice: Subject to any disclaimer, the term of this patent is extended or adjusted under 35 U.S.C. 154(b) by 104 days.

(21) Appl. No.: 13/469,628

(22) Filed: May 11, 2012

(51) Int. Cl.
*H02G 11/02* (2006.01)

(52) U.S. Cl.
USPC .................................. 191/12.2 R; 242/378.2

(58) Field of Classification Search
USPC ............... 191/11, 12 R, 12.2 A, 12.2 R, 12.4; 242/378.1, 378.2; 280/420, 421, 422
See application file for complete search history.

(56) References Cited

U.S. PATENT DOCUMENTS

| | | | | |
|---|---|---|---|---|
| 2,219,201 | A * | 10/1940 | Smith | 137/355.23 |
| 2,391,141 | A | 12/1945 | Dour et al. | |
| 2,518,071 | A * | 8/1950 | Rushworth | 242/378.2 |
| 2,856,016 | A * | 10/1958 | Lindeman | 180/14.5 |
| 3,144,218 | A * | 8/1964 | Tepe | 242/378.2 |
| 3,222,002 | A * | 12/1965 | Holberg | 242/388 |
| 4,008,791 | A | 2/1977 | Shafii-Kayany et al. | |
| 4,010,913 | A * | 3/1977 | Guerster et al. | 242/378.1 |
| 4,053,118 | A | 10/1977 | Aikins | |
| 5,129,828 | A | 7/1992 | Bass | |
| 5,143,392 | A | 9/1992 | Collins | |
| 5,535,960 | A | 7/1996 | Skowronski et al. | |
| 6,726,140 | B2 | 4/2004 | Wivagg | |
| 2009/0127368 | A1* | 5/2009 | Omli | 242/370 |

OTHER PUBLICATIONS

Various Images and Documents, retrieved from http://www.sears.com on or before Jan. 13, 2012.
Various Images and Documents, retrieved from http://www.coxhosereels.com or http://www.coxreels.com on or before Jan. 13, 2012.
35789_Triple_Air_Hose, retrieved from http://www.grainger.com on or before Nov. 17, 2011.
Installation and Maintenance Manuel, Coxreels, Inc. Apr. 2010, retrieved from http://www.coxreels.com/pdf/pm_001.pdf on Jan. 10, 2013.
Various Images and Documents, retrieved from http://www.legacymfg.com on or before Jan. 30, 2012.
Product Manuals, retrieved from http://www.recoila.com.au on or before Dec. 1, 2011.

* cited by examiner

*Primary Examiner* — Zachary Kuhfuss
(74) *Attorney, Agent, or Firm* — Bruce A. Young (57) ABSTRACT

A take-up reel assembly includes a frame, and a spindle, having an axis, which is coupled to the frame. A spool is positioned coaxially with the spindle and is able to rotate about the axis of the spindle. A flexible elongated member having a distal portion coupled to the spool and accessible from exterior of the spool, a middle portion positioned between the spindle and an inside surface of the spool, and a proximal portion coupled to the frame, has the middle portion of the elongated member wound as a helix about the spindle. The diameter of the helix changes with rotation of the spool.

25 Claims, 10 Drawing Sheets

TAKE-UP REEL ASSEMBLY

BACKGROUND

1. Technical Field

The present subject matter relates to a reel for winding up a continuous flexible elongated member. More particularly, it relates to a reel that allows one end of the continuous flexible elongated member to be wound up on the reel while the other end is in a fixed position.

2. Description of Related Art

Reels for holding cables, hoses, or other flexible elongated members (FEM) are well known in the art. For applications where both ends of the FEM are loose, one end of the FEM may simply be rolled onto a rotating reel while the other end twists. For applications where one end of the FEM is fixed, such as being connected to a supply source such as electricity, water, or air, some reels are fixed, allowing the loose end of the FEM to be wrapped around the reel from one end, but this may create twisting of the FEM and a mechanism to wind up the FEM that may be much more complicated than a simple rotating reel.

One common solution to the problem of how to reel in a FEM if one end is fixed is to provide a rotating connection as a part of the reel. For electrical cables, a rotating connection, such as a slip-ring connection, may include a rotating ring for each conductor with a fixed wiper making contact with each ring. Such rotating connections may be less reliable than non-rotating connections and may not be suitable for use in some environments, such as explosive environments, due to the possibility of generating electrical arcs. For hoses, a rotating union may be used in many applications, but rotating unions may not be suitable for certain applications such as very high pressure applications or applications using highly corrosive fluids.

BRIEF DESCRIPTION OF THE DRAWINGS

The accompanying drawings, which are incorporated in and constitute part of the specification, illustrate various embodiments. Together with the general description, the drawings serve to explain the principles. They should not, however, be taken to limit the invention to the specific embodiment(s) described, but are for explanation and understanding only. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

The term Flexible Elongated Member, or FEM, as used herein and in the claims, may refer to a flexible element having a length much longer than its width and thickness and a FEM be made of one or more of any of the following: electrical cables having any number of conductors, pneumatic hoses, hydraulic hoses, other types of fluid hoses, optical fibers or cables, ropes, cords, wires, cables, or any other flexible element having a length much longer than its width and thickness, A FEM may be have a cross-section that is round, square, triangular, or of any other shape.

Reference now is made in detail to the examples illustrated in the accompanying drawings and discussed below.

FIGS. 1, 2A, 2B, 2C, 3A, 3B, and 3C all show the same embodiment of a take-up reel assembly 10 and use common reference numbers throughout their descriptions. While the various figures are discussed separately, it may be helpful at times to look at the other views of the take-up reel assembly 10 to better understand the features discussed. In some cases, a component may be referenced in a discussion of a particular figure, even though that component may not be visible in that figure, so looking at the other views may be helpful in understanding the description.

Embodiments of the take-up reel assembly 10 as described herein, allow one end of a continuous flexible elongated member to be wound on the take-up reel 15 while the other end is in a fixed position. No rotating connection, such as a slip-ring or rotating union is needed, although some embodiments may include additional flexible elongated members that do use a slip-ring or rotating union. The take-up reel 10 may include a spindle 30, having an axis, which is coupled to the frame 20, and a spool 40 positioned coaxially with the spindle 30 and able to rotate about the axis. A continuous flexible elongated member (FEM) 50 having a distal portion 54, a proximal portion 51, and a middle portion 53, that is located between the distal portion 54 and the proximal portion 51, may be positioned so that the distal portion 54 may be wound on the spool 40. The proximal portion 51 may be coupled to the frame 20, with its near end in a fixed position that may be external to the frame 20. The middle portion 53 is positioned between the spindle 30 and an inside surface of the spool 40, and is wound as a helix about the spindle 30 with the proximal portion 51 exiting the take-up reel 15 on one side. The diameter of the helix changes with rotation of the spool 40, which allows the spool 40 to wind up the distal portion 54 without causing the proximal portion 51 to move or twist.

Figure 1:
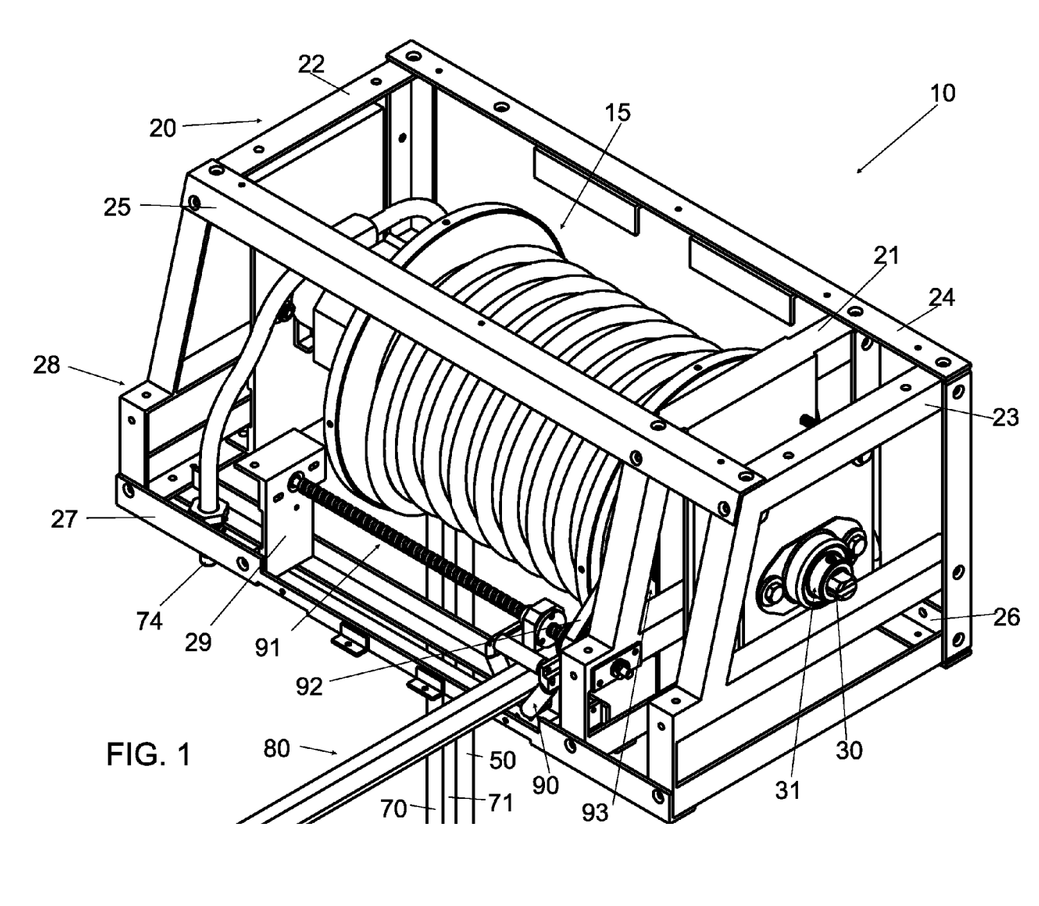
FIG. 1 shows an isometric view of an embodiment of a take-up reel assembly.

FIG. 1 shows an isometric view of an embodiment of a take-up reel assembly 10. The take-up reel assembly 10 may include a take-up reel 15 mounted in a frame 20. Some embodiments may include a cover (not shown) mounted to the frame. The take-up reel assembly 10 may be of any size, depending on the embodiment, but one embodiment may be about 22 inches wide, 10 inches high, and 12 inches deep. The frame 20 may be any type of structural support, depending on the embodiment, and may be built from any suitable material, including, but not limited to, aluminum, steel, stainless steel, engineering plastics such as acrylonitrile butadiene styrene (ABS) or polycarbonates, or wood. In the embodiment shown, the frame 20 includes the middle frame assembly 21, the left frame assembly 22 and the right frame assembly 23, which may be cast from aluminum or steel, stamped from sheet metal, such as a stainless steel, or may be constructed from multiple parts bolted, welded, riveted or otherwise bonded together. The frame 20 also includes a rear-top frame cross member 24, a front-top frame cross member 25, a rear-bottom frame cross member 26, and a front-bottom frame cross member 27 that are attached to the middle frame assembly 21, the left frame assembly 22 and the right frame assembly 23 using bolts, rivets, welds, glue or other methods of attaching the various pieces together. A front-middle frame cross member (not shown for clarity) may be included at position 28 attaching the left frame assembly 22, the guide support member 29, the middle frame assembly 21, and the right frame assembly 23.

The take-up reel 15 is discussed in more detail following but may include a spindle 30 that is coupled to the frame using the right spindle bearing 31 and left spindle bearing 32 to allow the spindle 30 to rotate about its axis. In other embodiments, the spindle may be fixed to the frame and unable to rotate, or may be coupled to the frame in various other ways. In the embodiment shown in FIG. 1, a continuous electrical cable 50 may be included as a part of a hybrid connection cable 80 that may also include two compressed air hoses. The hybrid connection cable 80 may be wound on the take-up reel 15 although other embodiments may wind up a single electrical cable, a single fluid hose, or any other flexible elongated member (FEM). A first proximal air hose 70 and second proximal air hose 71, which may be input air hoses in some embodiments, may provide a supply of air to the take-up reel assembly 10. The near ends of the proximal air hoses 70, 71 may be accessible from outside the take-up reel assembly 10 and may be terminated with an air fitting or other type connector. In some embodiments, a local air fitting 74 accessible from the exterior of the take-up reel assembly 10 and coupled to one of the two input hoses 70, 71 may be attached to the frame 20.

Some embodiments may include a guide 90, to position the FEM, such as the hybrid connection cable 80, on the take-up reel 15. A mechanical linkage from the take-up reel 15, or spool 20, to the guide 90 may move the guide 90 as the take-up reel 15 (including spool 20) rotates. A gear 93 may be coupled to the take-up reel 15 (or spool 20) to drive a belt 92. The belt 92 may turn a threaded rod 91 that may be coupled between the middle frame assembly 21 and the guide support member 29. As the threaded rod 91 rotates, the guide 90 may be moved back and forth on the rod by a threaded portion of the guide 90 that is threaded onto the threaded rod 91. The pitch of the threads on the threaded rod 91 may be such that the guide moves with the proper ratio to the rotation of the take-up reel 15 that the hybrid connection cable 80 is neatly wound back on the take-up reel 15 as the hybrid connection cable 80 is retracted. Other embodiments may use other mechanisms to move the guide 90.

The guide 90 may be shaped to match the hybrid connection cable 80. In some embodiments, the guide 90 may include three rollers to create a triangular shape for the hybrid connection cable 80 to pass through. The hybrid connection cable 80 may have a cross-section that is roughly triangular in shape, the shape of the cross-section being determined by the circular cross-sections of the three hoses or cables bonded together. The roughly triangular shape of the hybrid connection cable 80 in the triangular guide 90 may help to keep the hybrid connection cable 80 from twisting as it is wound on to the take-up reel 15. In some embodiments, a cover may be mounted to the frame 20 with a slot in the cover to allow the hybrid connection cable 80 to enter the take-up reel assembly 10 at any point where the guide 90 may be positioned. Brushes may be added to the cover along the top and/or bottom of the slot to help clean the hybrid connection cable 80 as it is retracted back into the take-up reel assembly 10.

Figure 2A:
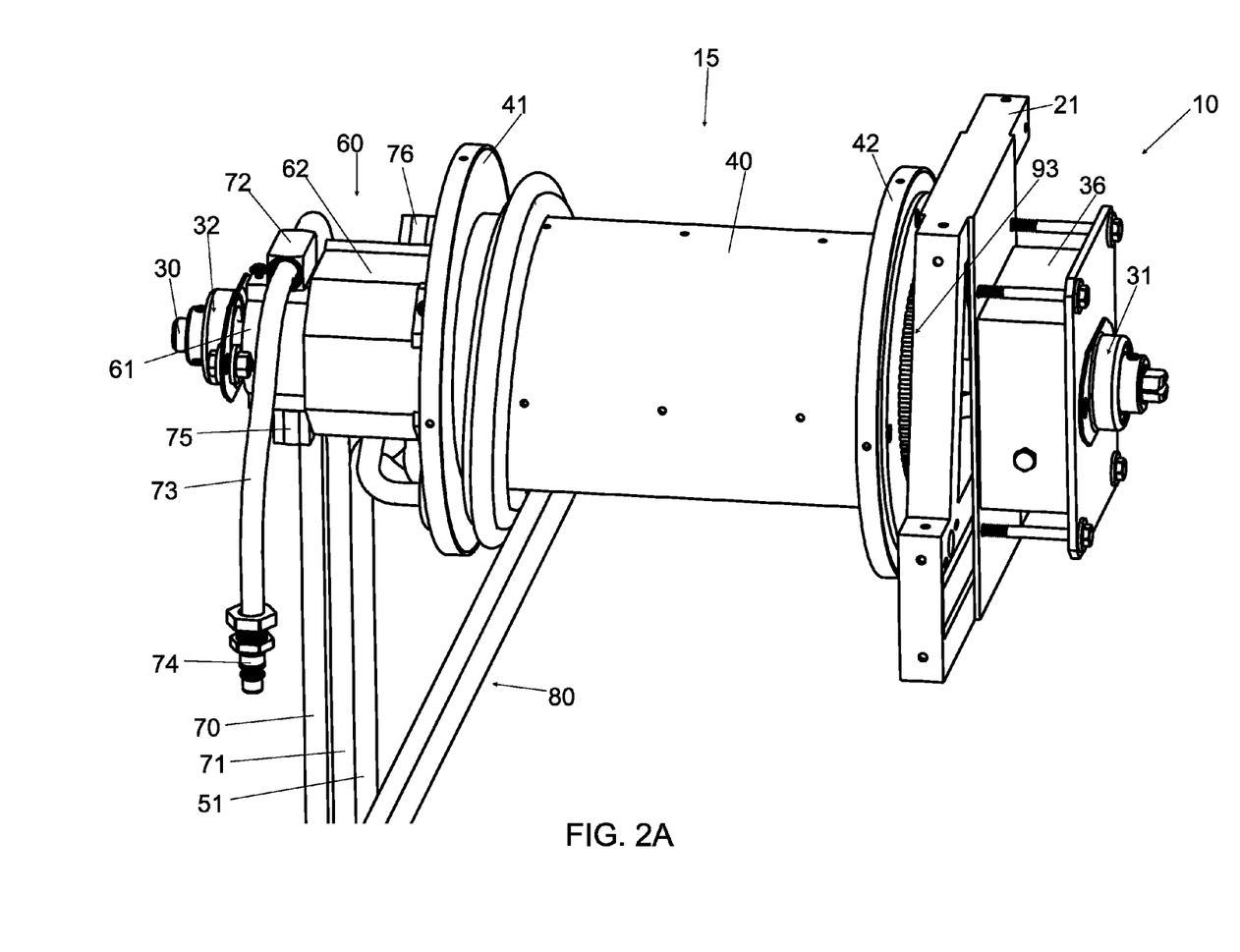
FIG. 2A shows an isometric view of the embodiment of a take-up reel assembly in an extended position with most of the frame removed for clarity.

FIG. 2A shows an isometric view of the embodiment of a take-up reel assembly 10 in an extended position with most of the frame 20 removed for clarity. The guide 90 and its associated mechanical linkage is also removed. The extended position is characterized by a majority of the hybrid connection cable 80 being pulled off the take-up reel 15. The take-up reel 15 includes the spindle 30, the spool 40, the left spool flange 41, and the right spool flange 42, which are fixed to each other and rotate with the spindle 30 about the axis of the spindle 30. The spindle 30 is coupled to the frame 20 by the right spindle bearing 31, which is coupled to the middle frame assembly 21, and the left spindle bearing 32, which is coupled to the left frame assembly 22, in the embodiment shown. In other embodiments, the spool 40, the left spool flange 41, and the right spool flange 42 may be fixed to each other but may rotate about the axis of the spindle 30 without the spindle 30 rotating. The spool 40 may include holes to allow water, such as condensation, to drain from the inside of the spool 40. A gear 93 may be coupled to the right spool flange 42, close to the middle frame assembly 21, and may be used to move a guide 90. A spring cover 36 may cover a spring 37 that may provide a force to the take-up reel 15 to rotate and retract the hybrid connection cable 80.

An electrical cable 50, including a proximal portion 51, a middle portion 53, and a distal portion 54, may include one or more electrical conductors to carry electrical power and/or other electrical signals. In some embodiments, the source of the electrical power may be coupled to the near end of the proximal portion 51 of the electrical cable 50, which may be accessible from outside of the take-up reel assembly 10, although in other embodiments, the source may be coupled to the far end of the distal portion 54. Some embodiments may have some conductors carrying power in one direction and other conductors carrying power in the other direction. In at least one embodiment, the electrical cable 50 may include seven conductors and may be compliant with the Society of Automotive Engineers (SAE) J2394 specification. At least one other embodiment may use an electrical cable 50 having four conductors, although other embodiments may have any number of conductors. The electrical cable 50 may have any diameter, but in some embodiments, the diameter may be between about 0.2 inches and about 1 inch. In at least one embodiment, the electrical cable may have a diameter of about 0.6 inches.

Some embodiments may include additional flexible elongated members that may be coupled using a slip-ring or rotating union. In the embodiment shown, the take-up reel assembly 10 includes two air hoses that utilize a rotating union 60 to provide two air paths. A first proximal air hose 70 and a second proximal air hose 71 may be connected to a source of compressed air, although some embodiments may couple the proximal air hoses 70, 71 to a consumer of compressed air. The first proximal air hose 70 may be coupled to the fixed portion 61 of the rotating union 60 by a T-fitting 72. A local air hose 73 may also be coupled to the T-fitting 72 to provide compressed air to the local air fitting 74 in some embodiments. A second air hose 71 may be coupled to the fixed portion 61 of the rotating union 60 by a hose fitting 75.

Figure 2B:
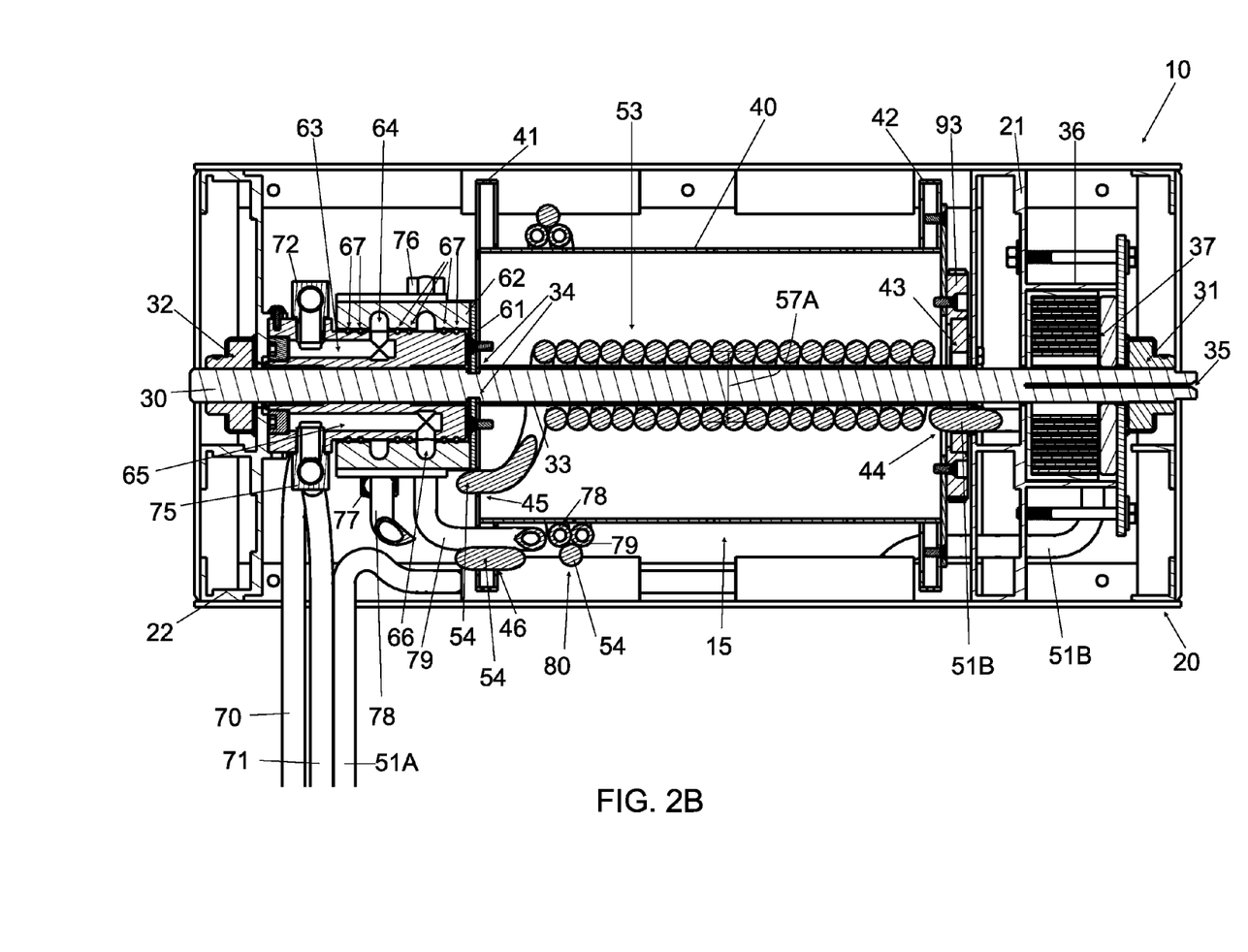
FIG. 2B, shows a cross-sectional front view of the embodiment of a take-up reel assembly in an extended position.

FIG. 2B, shows a cross-sectional front view of the embodiment of a take-up reel assembly 10 in an extended position. The fixed portion 61 of the rotating union 60 may be fixedly coupled to the left frame assembly 22 and may have an opening to allow the spindle 30 to pass through the fixed portion 61 of the rotating union 60 to allow the spindle 30 to rotate freely. The fixed portion 61 of the rotating union 60 may include a first fixed air chamber 63, that is coupled to the first proximal air hose 70 by the T-fitting 72, and a second fixed air chamber 65, that is coupled to the second proximal air hose 71 by hose fitting 75.

A rotating portion 62 of the rotating union 60 may be coupled to the right spool flange 41 and may rotate with the take-up reel 15. A first rotating air chamber 64 in the rotating portion 62 of the rotating union 60 may be annular in shape and may allow air to pass between the first fixed air chamber 63 and the first rotating air chamber 64 at any angular position of the rotating portion 62 with respect to the fixed portion 61 of the rotating union 60. A second rotating air chamber 66 in the rotating portion 62 of the rotating union 60 may be annular in shape and may allow air to pass between the second fixed air chamber 65 and the second rotating air chamber 66 at any angular position of the rotating portion 62 with respect to the fixed portion 61 of the rotating union 60. O-rings 67 may be positioned to seal the rotating air chambers 64, 66 may be greased in some embodiments to facilitate easy rotation of the rotating portion 62 of the rotating union 60.

A first distal air hose 78 may be coupled to the first rotating air chamber 64 by hose fitting 77 to allow air to move between the first proximal air hose 70 and the first distal air hose 78. A second distal air hose 79 may be coupled to the second rotating air chamber 66 by hose fitting 76 to allow air to move between the second proximal air hose 71 and the second distal air hose 79 The first distal air hose 78 and second distal air hose 79 may pass through a flange opening 46, along with the distal portion 54 of the electrical cable 50. The first distal air hose 78, the second distal air hose 79, and the distal portion 54 of the electrical cable 50 may be bonded together, for at least some of their length, to create a hybrid connection cable 80 in some embodiments. Various embodiments may use tape or fabric wrapped around the hybrid connection cable 80 to bond the first distal air hose 78, the second distal air hose 79, and the distal portion 54 of the electrical cable 50 together. Other embodiments may use glue, cable-ties, string, or other attachment method to bond the first distal air hose 78, the second distal air hose 79, and the distal portion 54 of the electrical cable 50 together. In some embodiments, the first distal air hose 78, the second distal air hose 79, and the distal portion 54 of the electrical cable 50 may be molded into a common jacket or slid into a sleeve. The hybrid connection cable 80 may then be wound onto the spool 40 although other embodiments may not bind the first distal air hose 78, the second distal air hose 79, and the distal portion 54 of the electrical cable 50 together, and may wind them individually on the spool 40.

The various hoses 70, 71, 78, 79 may be of any size and strength depending on the embodiment. In some embodiments, the various hoses 70, 71, 78, 79 may be have an inside diameter of between about ¼ inch and about ½ inch, inclusive. In some embodiments, the various hoses 70, 71, 78, 79 may support pressures of between about 5 and about 1000 pounds per square inch (psi). In at least one embodiment, the hoses have an inside diameter of about ⅜ inch, and support a working pressure of at least 200 pounds per square inch. In some embodiments, the hoses 70, 71, 78, 79 may be compliant with an SAE J1402 specification. The characteristics of the rotating union 60 may also vary, depending on the embodiment, but in at least one embodiment, the dimensions of the various air chambers 63-66 are designed to have a minimum cross-sectional area equal to that of a ⅜ inch diameter circle.

More detail of the construction of the take-up reel 15 may be seen in FIG. 2B. The right spool flange 41 may include several pieces and may be fixed to the spindle 30 by engaging the spindle grooves 34 cut into the spindle 30, although other embodiments may use other techniques, such as set screws, a pin through the spindle 30, or welding, to fix the right spool flange 41 to the spindle 30. The spool 40 is held between the right spool flange 41 and the left spool flange 42 and may be fixed to the flanges 41, 42 by the use of bolts, rivets, glue, welds or any other fastening technique. The spindle 30, spool 40, right spool flange 41, and left spool flange 42 may be made of any suitable material, including, but not limited to, aluminum, steel, stainless steel, and plastic. A right spool bearing 43, which includes an inner section that does not rotate with the take-up reel 15 and an outer section that rotates with the take-up reel 15, may be used to help stabilize the right side of the take-up reel 15. In some embodiments, the inner section of the right spool bearing 43 may be bolted or otherwise fixed to the middle frame assembly 21. Some embodiments may include a sleeve 33 over the spindle 30 inside of the spool 40. The sleeve may be made of a low-friction polymeric material, such as nylon or DuPont™ Delrin® acetal resin, in some embodiments, to minimize friction between the middle section 53 of the electric cable 50 and the spindle 30.

A spring 37 may be included as a retraction mechanism to provide a rotational torque to the take-up reel 15, including the spool 20. The spring 37 may be a flat spiral constant force spring and may engage a slot 35 in the spindle 30 at one end and a portion of the frame 20 or the spring cover 36 at the other end. As the take-up reel 15 is turned to extend the hybrid connection cable 80, the spring 37 may be tensioned and may supply a torque to retract the hybrid connection cable 80. In at least one embodiment, the spring 37 may provide between about 30 and about 50 foot-pounds of torque. Other embodiments may use an electric motor to rotate the spool 20. Various embodiments may use a variety of mechanisms to rotate the spool 20 including, but not limited to, a crank, a pneumatic motor, a fluid driven turbine, an internal combustion engine, or any other mechanism to provide a torque to the spool 20.

An external portion 51A of the proximal portion 51 of the electrical cable 50 may have its near end connected to an electrical supply which does not rotate with the take-up reel 15. An internal portion 51B of the proximal portion 51 of the electrical cable 50 may be routed inside the frame 20 and may pass into the take-up reel 15 though the right spool opening 44. The electrical cable 50 inside the spool 20 once it has passed through the right spool opening 44 may be referred to as the middle portion 53 of the electrical cable 50. Some embodiments may include a non-rotating connector on the proximal portion 51 of the electrical cable 50 near the right spool opening 44 to allow more flexibility in the length of the cable to reach the electrical connection point. In the embodiment shown, the right spool opening 44 is located in the inner section of the right spool bearing 43, since the inner section is fixed to the frame 20.

The middle portion 53 of the electrical cable 50 is positioned between the spindle 30 and an inside surface of the spool 40, and is wound as a helix about the spindle 30. In some embodiments, a sleeve 33 may be positioned between the spindle 30 and the helix formed by the middle portion 53 of the electrical cable 50. Helix, as used herein and in the claims, refers to a coiled shape of the cable 50 which may not be a mathematically perfect helix. The various loops of the helix shape of the middle portion 53 of the cable 50 may not have the same diameter, may be somewhat non-circular in shape, may have their centers offset from the axis of the spindle 30, and the spacing between the loops may be irregular. The loops may even have some amount of overlap. Any roughly coiled or helical shape may be considered a helix for the purposes of this disclosure and claims. In some embodiments the middle portion 53 of the electrical cable 50 may be pre-formed into a helical shape before being assembled into the take-up reel assembly 10. In some embodiments, the middle portion 53 may be short enough to allow the diameter 57A of the helix to be tightly wound about the spindle 30 as the spool 40 is rotated. In other embodiments, the length of the middle portion 53 may be long enough that the diameter 57A of the tightly wound helix is larger than the diameter of the spindle 30.

The electrical cable 50 may pass out of the spool 40 through a left spool opening 45 which may be thought of as a demarcation between the middle portion 53 and the distal portion 54 of the electrical cable 50 and may couple the distal portion 54 to the spool 40. The distal portion 54 may then pass through the flange opening 46 and be bound with the first distal air hose 78 and the second distal air hose 79 to form the hybrid connection cable 80.

Because the proximal portion 51 of the electrical cable 50 is coupled to the frame 20 and the distal portion 54 of the electrical cable 50 is coupled to the spool, the diameter 57A changes as the spool 40 rotates. The direction that the helix is wound about the spindle 30 may be different in different embodiments, but in the embodiment shown, the diameter 57A of the helix will decrease as the spool 40 rotates in a direction where the bottom of the spool 40 moves toward the viewer of FIG. 2B and the top of the spool 40 moves away from the viewer, which may be referred to as the extension angular direction. Pulling out the hybrid connection cable 80 to unwind the hybrid connection cable 80 from the take-up reel 15 may rotate the spool 40 in the extension angular direction and may cause the diameter 57A of the helix to decrease. Other embodiments may wind the hybrid connection cable 80 around the spool 40 in the opposite direction so that rotation of the take-up reel 15 in the extraction direction may wind the hybrid connection cable 80 on the spool 40.

In FIG. 2B, the helix is tightly wound about the sleeve 33 around the spindle 30 so that the spool 40 may not be rotated further in the extension angular direction. In some embodiments, having the helix wound tight about the spindle 30 (or sleeve 33) may serve as a stop to end further rotation in the extraction angular direction. Some embodiments may use a mechanical stop on the movement of the guide 90 to stop the rotation of the take-up reel 15 in the extraction angular direction. Because the horizontal movement of the guide 90 is linked to the rotation of the take-up reel 15, if the guide 90 is moved fully to one side where it hits a mechanical stop so that it cannot be moved further, the mechanical linkage using the threaded rod 91, belt 92, and gear 93 will also be stopped.

Since the gear 93 is fixed to the take-up reel 15, the take-up reel 15 will also be stopped. Other embodiments may use other mechanisms to stop the rotation of the take-up reel 15 in the extraction direction or may simply allow all of the hybrid connection cable 80 to be unwound from the take-up reel 15, depending on the application.

Figure 2C:
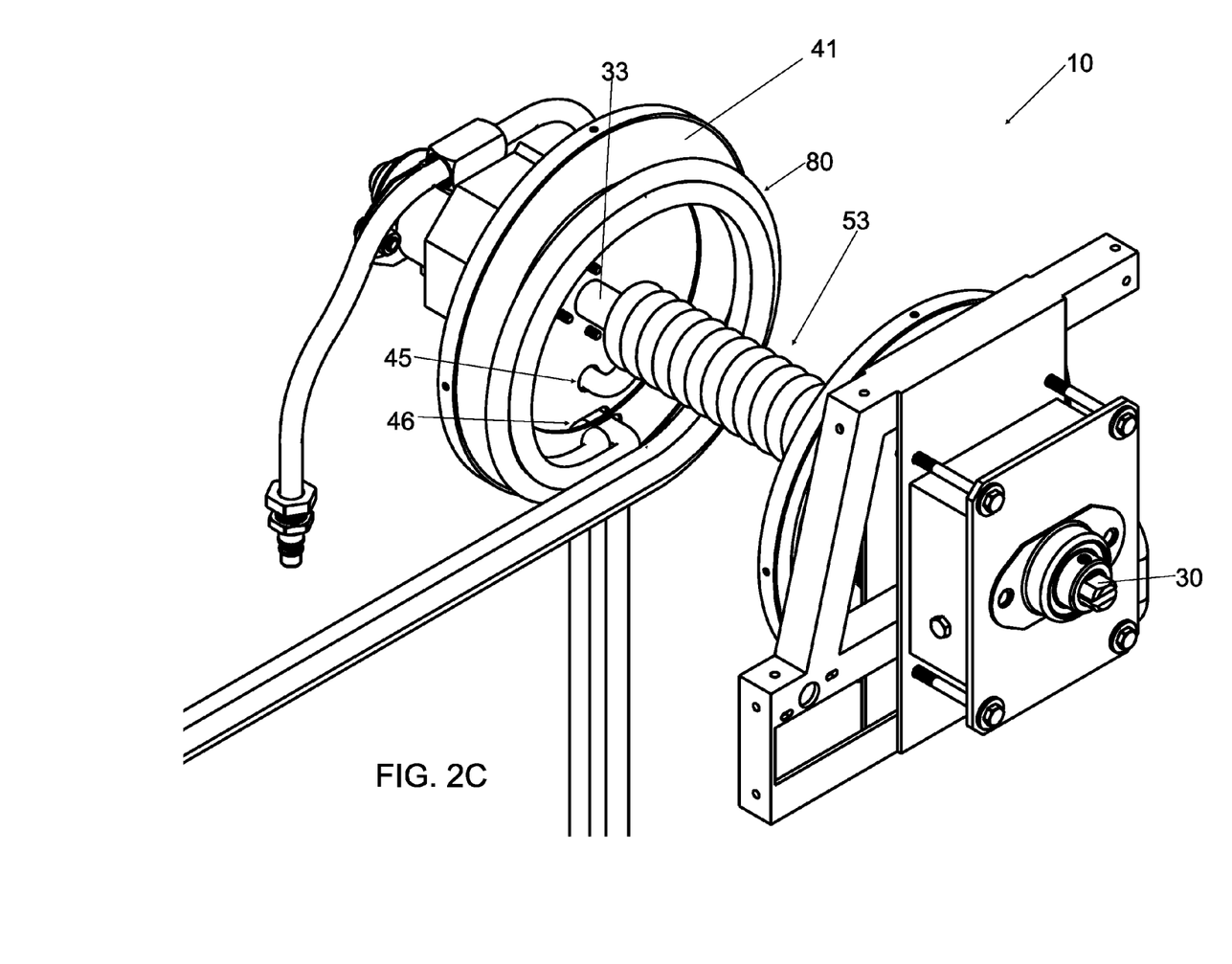
FIG. 2C shows an isometric view of the embodiment of a take-up reel assembly in an extended position with most of the frame and the spool removed.

FIG. 2C shows an isometric view of the embodiment of a take-up reel assembly 10 in an extended position with most of the frame 20 and the spool 40 removed. The guide 90 and its associated mechanical linkage is also removed. The helix of the middle portion 53 of the electrical cable 50, tightly wound about the sleeve 33 covering the spindle 30, may be seen with the spool 40 removed. The left spool opening 45 and flange opening 46 in the left flange 41 can also be seen. FIG. 2C shows the take-up reel assembly 10 in an extended position, so a majority of the hybrid connection cable 80 is unwound, leaving only one wrap of the hybrid connection cable 80 on the spool 40.

Figure 3A:
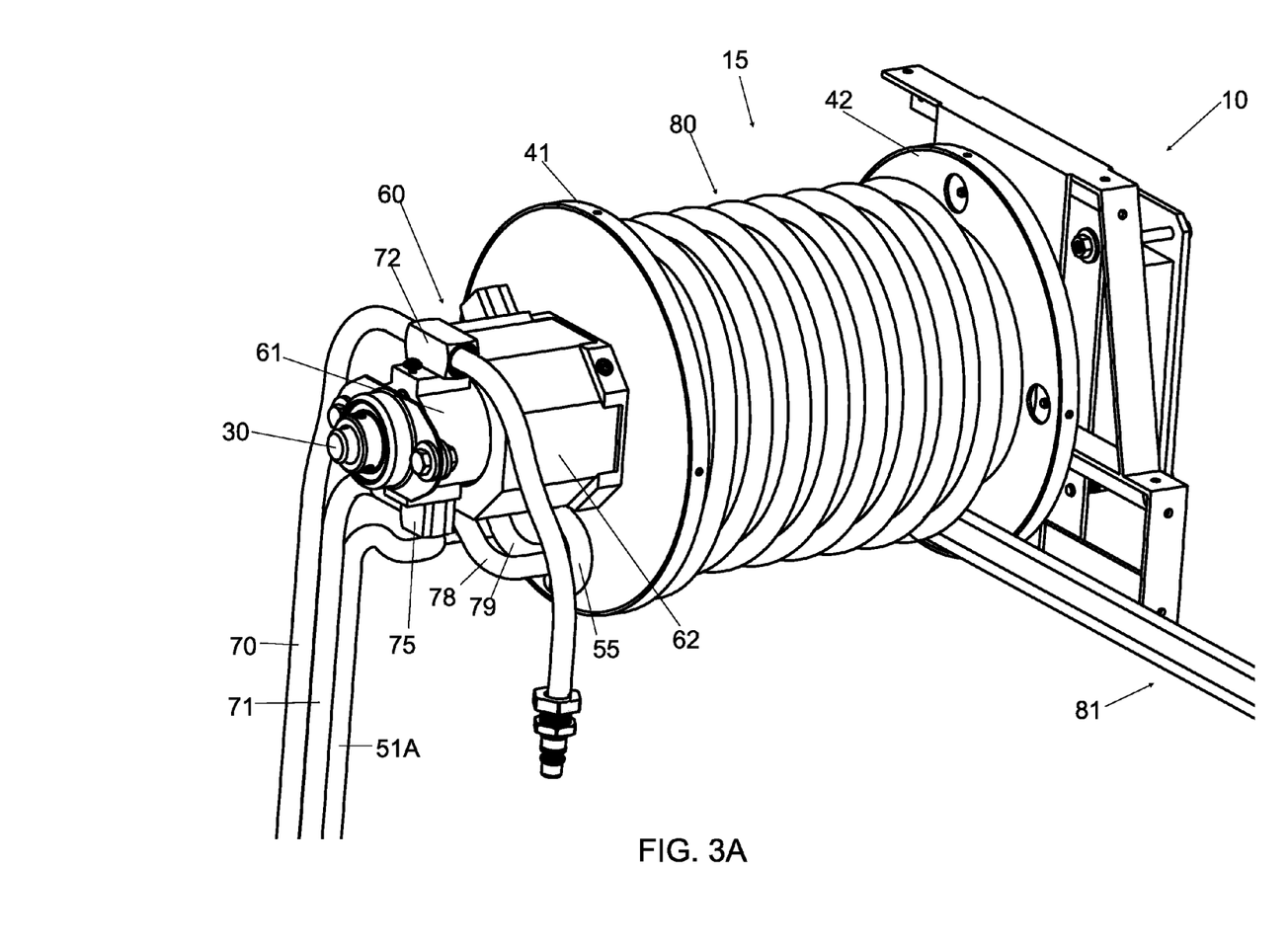
FIG. 3A shows an isometric view of the embodiment of a take-up reel assembly in a retracted position with most of the frame removed for clarity.

FIG. 3A shows an isometric view of the embodiment of a take-up reel assembly 10 in a retracted position with most of the frame 20 removed for clarity. The guide 90 and its associated mechanical linkage is also removed. In the retracted position, a majority of the hybrid connection cable 80 may be wound on the take-up reel 15, leaving only a hybrid connection tail 81 extending out of the frame 20. In some embodiments, the hybrid connection cable 80 may fill the take-up reel 15 with one layer of the hybrid connection cable 80 between the left flange 41 and the right flange 42. Some or all of the hybrid connection tail 81 may have the distal portion 54 of the electrical cable 50, the distal air hose 78 and the distal air hose 79 separated to allow their ends to be individually terminated. In some embodiments, the far end of the distal portion 54 of the electrical cable 50 may be terminated with an electrical connector, such as a connector compliant with an SAE J560 specification, and the far ends of the distal hoses 78, 79 may be terminated with air-hose fittings such pneumatic connector compliant with an SAE J318 specification, which may be referred to as gladhand couplers. The length of the hybrid connection tail 81 may vary between embodiments, but may be between about 12 inches and about 48 inches.

In some embodiments a donut clamp may be mounted on the hybrid connection cable 80 to provide a stop to limit the amount of the hybrid connection cable 80 that may be retracted back onto the take-up reel 15. Some embodiments may use a mechanical stop on the movement of the guide 90 to limit the amount of the hybrid connection cable 80 that is retracted. Other embodiments may use other mechanisms to limit the amount of the hybrid connection cable 80 to be retracted, or may retract all of the hybrid connection cable 80, depending on the application.

More detail may be seen of the connections of the connections to the rotating union 60. The first proximal air hose 70 is coupled to the fixed portion 61 of the rotating union 60 by T-fitting 72 and the second proximal air hose 71 is coupled to the fixed portion 61 of the rotating union 60 by air fitting 75. The fixed portion 61 of the rotating union 60 and the proximal air hoses 70, 71 are fixedly coupled to the frame 20. The rotating portion 62 of the rotating union 60 is fixedly coupled to the left flange 41 of the take-up reel 15 and rotates with the take-up reel 15. The distal air hoses 78, 79, which are a part of the hybrid connection cable 80, are coupled to the rotating portion 62 of the rotating union 60. A small portion of the electrical cable 50, the flange loop 55, which is a part of the distal portion 54 of the electrical cable 50, is visible in FIG. 3A. The flange loop 55 is the part of the electrical cable between the left spool opening 45 and the flange opening 46 and the flange loop 55 rotates with the take-up reel 15.

Figure 3B:
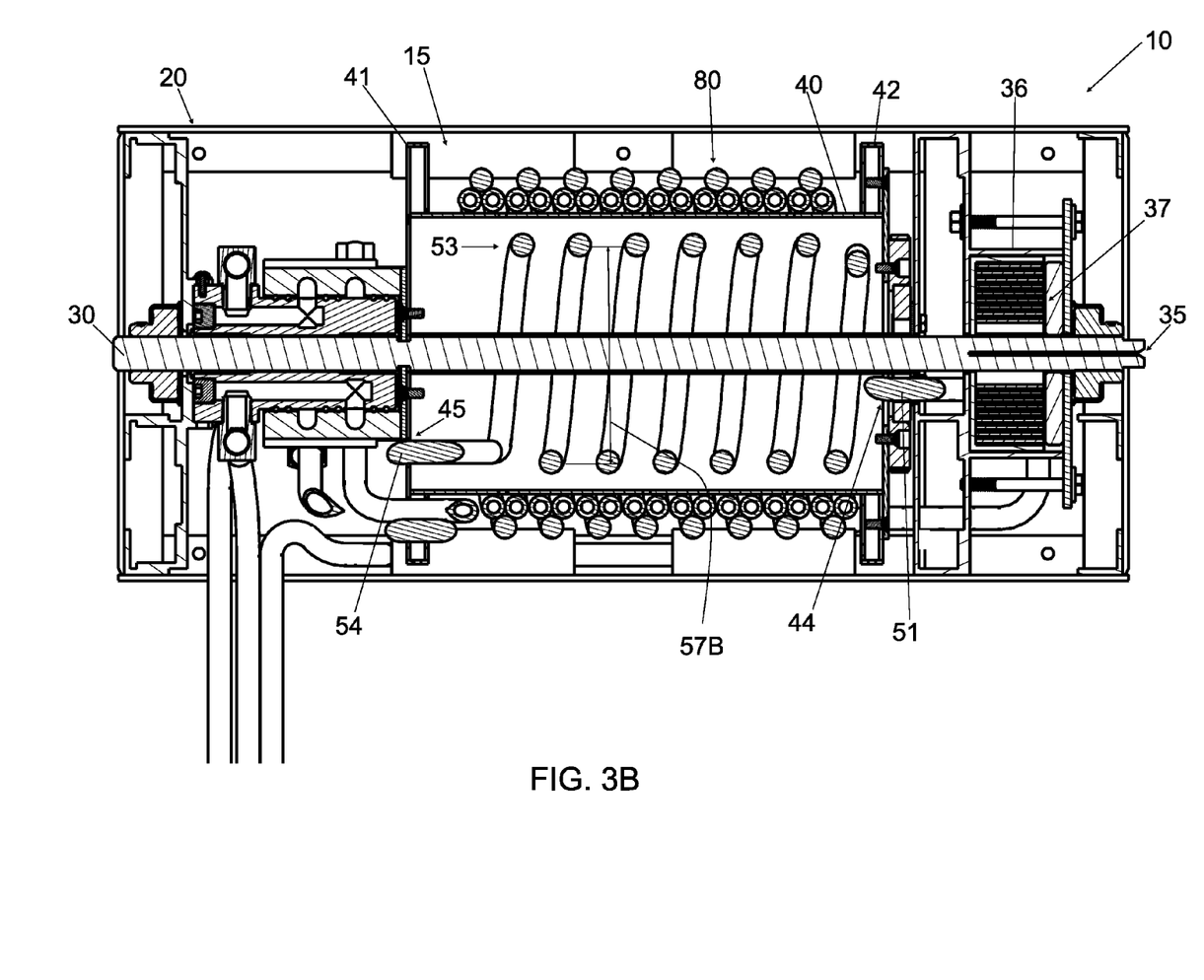
FIG. 3B, shows a cross-sectional front view of the embodiment of a take-up reel assembly in a retracted position.

FIG. 3B, shows a cross-sectional front view of the embodiment of a take-up reel assembly 10 in a retracted position. The angle of the take-up reel 15 with respect to the frame 20 is the same as that in FIG. 2B. The difference between FIG. 3B and FIG. 2B is that the take-up reel 15 has been rotated 7 full rotations in the retraction angular direction, which is the opposite of the extension angular direction. Other embodiments may use any number of rotations of the take-up reel 15 to wind up the hybrid connection cable 80. In at least one embodiment, the outside diameter of the spool 40 is about 6.2 inches and the distance from the left flange 41 to the right flange 42 on the outside of the spool 40 is about 9.5 inches. The hybrid take-up cable may be any size but in the at least one embodiment, the hybrid take-up cable 80 is about 1 inch wide allowing up to nine wraps to lay on the spool 40 between the flanges 41, 42, providing for at least 8 full turns of the hybrid connection cable 80 to be wrapped on the spool 40. This allows up to about 13 feet of the hybrid connection cable 80 to be wrapped on the take-up reel 15 in the at least one embodiment. So in some embodiments, at least 10 feet of the hybrid connection cable 80 is wrapped around the spool 40 in the retracted position and the hybrid connection cable 80 extends at least 10 feet from the take-up reel assembly 10 in the extended position. The extended distance may include the length of the tail 81 of the hybrid connection cable 80.

Figure 3C:
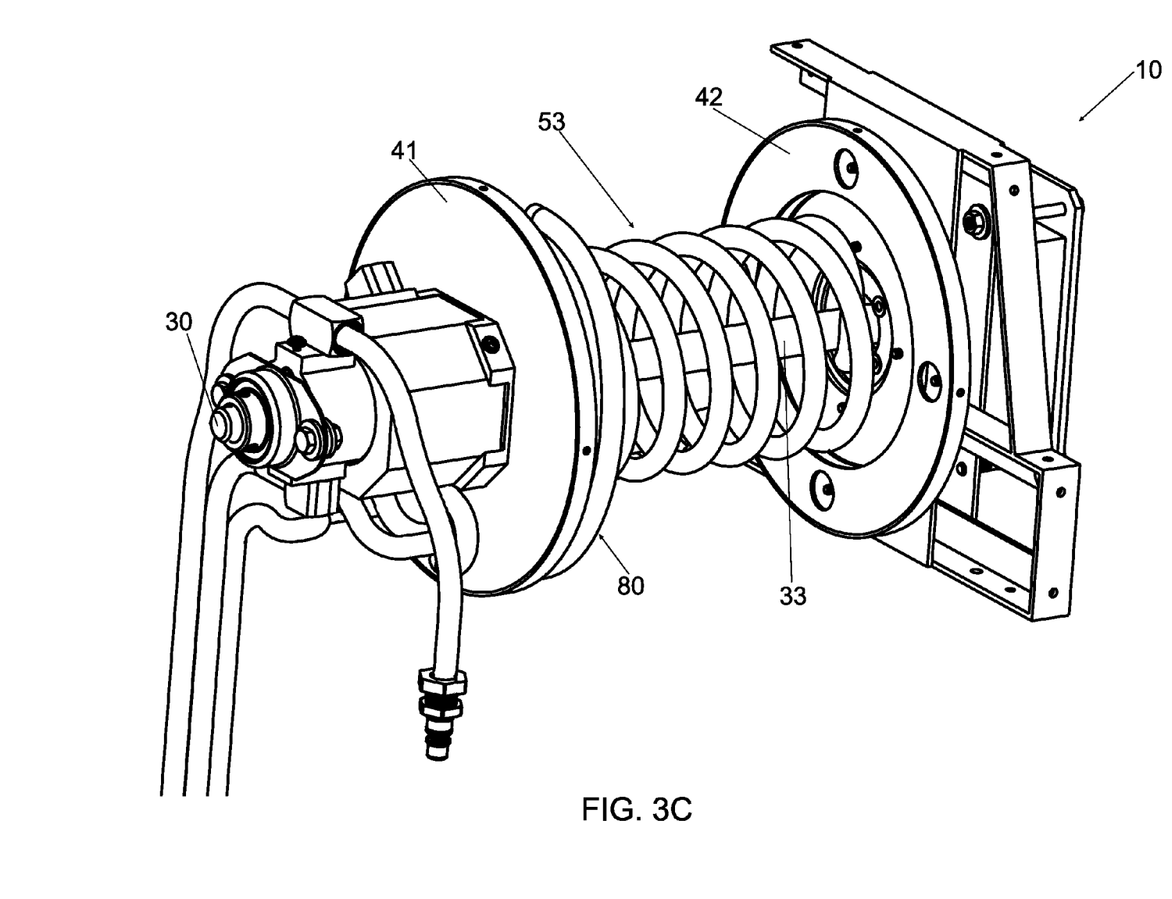
FIG. 3C shows an isometric view of the embodiment of a take-up reel assembly in a retracted position with the most of frame, most of the hybrid connection cable, and the spool removed.

The spring 37 may provide a torque in the retraction angular direction to retract the hybrid connection cable 80 and wind it onto the take-up reel 15 to change the take-up reel assembly 10 from the extended position shown in FIG. 2A-C to the retracted position shown in FIG. 3A-C. The spring 37 may be coupled to the spring cover 36 at one end, and may engage with the spindle slot 35 by sliding the other end of the spring 37 through the slot 35. The spring 37 may be pre-tensioned during assembly, so that the spring 37 is providing torque to take-up reel assembly 15 through the spindle 30 even as the take-up reel assembly 10 is in the retracted position.

The proximal portion 51 of the electrical cable 50 enters the spool 40 through the right spool opening 44 where it becomes the middle portion 53 of the electrical cable 50. The middle portion 53 is wrapped around the spindle 30 in a helical shape with the diameter 57B larger in the retracted position than in the extended position in the embodiment shown. The electrical cable 50 then exits the spool 40 through the left spool opening 45 and becomes the distal portion 54 of the electrical cable.

In at least one embodiment, the electrical cable 50 is about 0.6 inches in diameter, and the middle portion 53 of the electrical cable 50 is about 90 inches long and is pre-formed into a helix about 9 inches long and having a diameter of about 3.5 inches to create about 8 loops. After the being installed into the take-up reel assembly 10 as shown, if take-up reel 15 is rotated about 7 full turns in the extension angular direction to create 15 loops, the helix would have an inside diameter of about 1.3 inches. If the take-up reel 15 is rotated about 9 full turns back in the retraction direction to create about 6 loops, the helix would have an outside diameter of about 5.4 inches. So if the sleeve 33 has an outside diameter of less than about 1.3 inches and the spool 40 has an inside diameter of less than about 5.4 inches, the take-up reel 15 is able to support up to about 9 full turns between an extended and a retracted position in that embodiment.

If the tail 81 of the hybrid connection cable 80 is pulled to start to unwind the hybrid connection cable 80 from the spool 40, the take-up reel 15 is rotated in the extension angular direction. The rotation may add tension to the spring 37 and make the diameter 57B of the helix formed by the middle portion 53 of the electrical cable 50 smaller. In some embodiments, the middle portion 53 of the electrical cable 50 may be pre-formed into a large helix that is made smaller as the hybrid connection cable 80 is extended, so that the helix itself acts as a spring, adding torque to the take-up reel 15 in the retraction angular direction.

FIG. 3C shows an isometric view of the embodiment of a take-up reel assembly 10 in a retracted position with the most of frame 20, most of the hybrid connection cable 80, and the spool 40 removed. The guide 90 and its associated mechanical linkage is also removed. With only one wrap of the retracted hybrid connection cable 80 shown next to the left flange 41, the larger helix around the sleeve 33 covering the spindle 30 formed by the middle portion 53 of the electrical cable 50 can be easily seen.

Figure 4A:
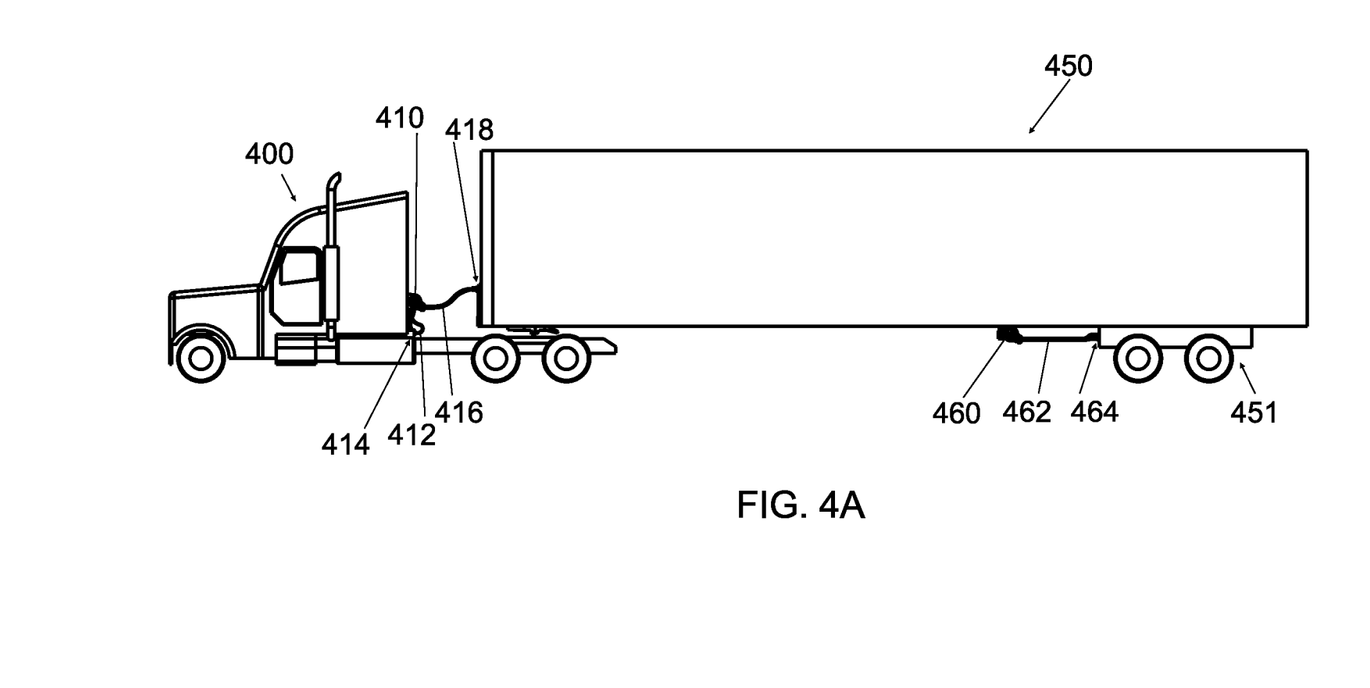
FIG. 4A shows an embodiment of take-up reel assemblies used for trucking connections.

FIG. 4A shows an embodiment of take-up reel assemblies 410, 460 used for trucking connections. A truck 400, which also may be referred to as a power unit, may have a take-up reel assembly 410 mounted on the back of the cab of the truck 400 or elsewhere on the truck 400. The take-up reel assembly 410 may be similar to the take-up reel assembly 10 described in detail above. Supply lines 412, which may include an electrical cable and two air hoses, may be coupled to supply connections 414 of the truck 400 to provide electrical power and compressed air. A hybrid connection cable 416 may be extended from the take-up reel assembly 410 and coupled to the trailer connections 418 on the trailer 450. An electrical connection to the trailer lights and other electrical circuits of the trailer 450 may be made using a connecter compliant with an SAE J560 specification, and the air hoses may be coupled to the trailer brake air supply using gladhand couplers compliant with an SAE J318 specification. The take-up reel assembly 410 may extend or retract the hybrid connection cable 416 as necessary as the truck and trailer turn causing the distance between the take-up reel assembly 410 and the trailer connections 418 to change.

A method of coupling a truck 400 to a trailer 450 may include mounting a take-up reel assembly 410 to the truck 400 and coupling the near ends of the two input hoses of the supply lines 412 to air supplies of the supply connections 414 of the truck. The method may also include coupling the near end of the electrical cable of the supply lines 412 to electrical connections of the supply connections 414 of the truck. A hybrid connection cable 416 may be extended from the take-up reel assembly 410. A connector on the far end of the electrical cable of the hybrid connection cable 416 may be coupled to a mating electrical connector of the trailer connections 418 on the trailer 450, and pneumatic connectors on the far ends of two output hoses of the hybrid connection cable may be coupled to mating pneumatic connectors of the trailer connections 418 on the trailer 450.

A take-up reel assembly 460, which may be similar to the take-up reel assembly 10 described in detail above, may be mounted under the trailer 450 and the supply lines of the take-up reel assembly 460 coupled to the electrical circuits and air supplies of the trailer. A hybrid connection cable 462 may be extended from the take-up reel assembly 460 and connected to the connections 464 on the moveable wheel assembly 451 of the trailer 450. The moveable wheel assembly 451 may be moved with respect to the trailer 450 without disconnecting the hybrid connection cable 462, which may extend or retract with the movement of the moveable wheel assembly 451.

A method of coupling a trailer 450 to a moveable rear wheel assembly 451 may include mounting a take-up reel assembly 460 to the trailer 450 and coupling the near ends of the two input hoses to air supplies the trailer 450. The method may also include coupling the near end of the electrical cable to electrical connections of the trailer 450. A hybrid connection cable 462 may be extended from the take-up reel assembly 460. A connector on the far end of the electrical cable of the hybrid connection cable 462 may be coupled to a mating electrical connector of the connections 464 on the moveable wheel assembly 451, and pneumatic connectors on the far ends of two output hoses of the hybrid connection cable may be coupled to mating pneumatic connectors of the connections 464 on the moveable wheel assembly 451.

Figure 4B:
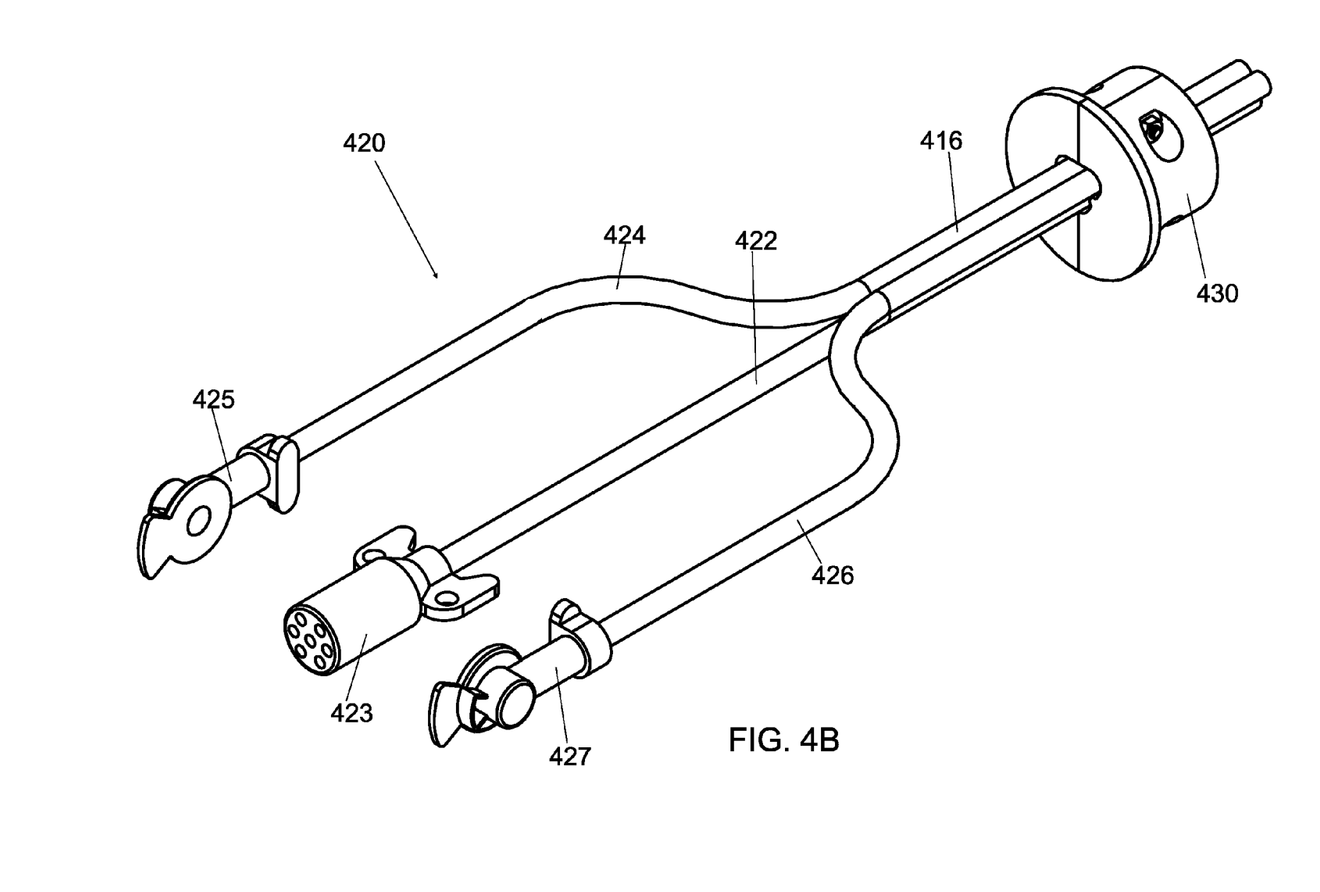
FIG. 4B shows couplings that may be used in some embodiments.

FIG. 4B shows couplings that may be used in some embodiments. The hybrid connection cable 416 may have a hybrid connection tail 420 where the electrical cable 422, the first hose 424 and the second hose 426 are separated instead of being bound together in the hybrid connection cable 416. The hybrid connection tail 420 may be of any length but may be between about 1 foot and about 4 feet in some embodiments. Some embodiments may include a donut clamp 430 around the hybrid connection cable 416 to keep the take-up reel assembly 410 from retracting too much of the hybrid connection cable 416.

The electrical cable 422 may be compliant with the SAE J2394 specification and may be terminated in an electrical connector 423. In at least one embodiment, electrical connector 423 may be compliant with the SAE J560 specification. The first hose 424 and second hose 426 may be of any size, and may support any working pressure, but in some embodiments, the hoses 424, 426 may be compliant with the SAE J1402 specification, may have an inside diameter of ¼ inch, ⅜ inch, or ½ inch, and may support a working pressure of at least about 200 pounds per square inch. The first hose 424 may be terminated with a pneumatic connector 425 and the second hose 426 may also be terminated with a pneumatic connector 427. The pneumatic connectors 425. 427 may be compliant with the SAE J318 specification and may be referred to as gladhand couplers.

Figures 5A, 5B:
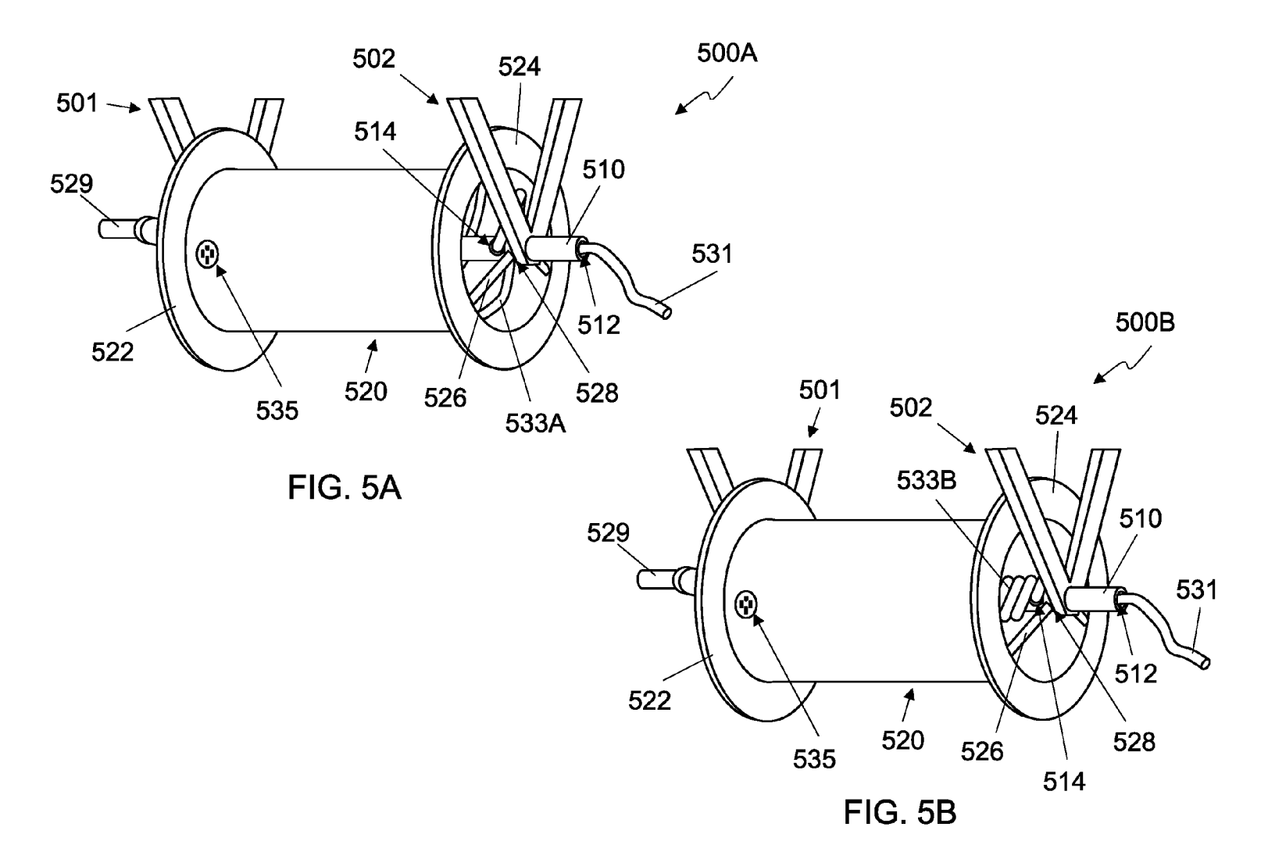
FIGS. 5A and 5B show an alternative embodiment of a take-up reel assembly in extended and retracted positions, respectively.

FIGS. 5A and 5B show an alternative embodiment of a take-up reel assembly in extended 500A and retracted 500B positions, respectively. The take-up reel assembly 500A/B is coupled to a frame including a left side support 501 and a right side support 502. A spindle 510 is fixedly attached to the left side support 501 and the right side support 502. The spindle 510 may be hollow and may have an opening 514 located between the left side support 501 and the right side support 502. A spool 520 with left flange 522 and right flange 524 may be positioned coaxially with the spindle 510 and may be supported by spokes 526 to rotating sleeve 528 (and comparable spokes and rotating sleeve on the left side where they are hidden from view) and able to rotate about the axis of the spindle 510. One or more crank handles 529 may extend from the left flange 522 and may be used to rotate the spool 520. The left side support 501 may be designed to ensure that there is no interference with the one of more crank handles 529. Other embodiments may use springs, motors, or other mechanisms to rotate the spool 520.

The take-up reel assembly 500A/B may be useful for extending and retracting any type of flexible elongated member (FEM). In some embodiments, the FEM may be an electrical cable. The electrical cable may have any number of conductors, may support any voltage and/or current, and may be of any size, but some embodiments, the electrical cable may have between 2 and 10 conductors, support a voltage of up to 500 volts, and may have a roughly circular cross-section with a diameter of between about 0.2 and about 1 inch. In at least one embodiment, the FEM may be an electrical cable having 2 or 3 conductors of between 14 and 00 American wire gauge (AWG) in size to create an electrical cable having a diameter of between about 0.2 and about 1 inch. In another embodiment, the electrical cable may have 4 conductors and in yet another embodiment, the electrical cable may have 7 conductors. In some embodiments, the various conductors of the electrical cable may be insulated to allow a voltage of between about 100 volts of alternating current (VAC) and about 500 VAC. In other embodiments, the various conductors of the electrical cable maybe insulted to allow a voltage of up to about 50 volts of direct current (VDC). In at least one embodiment, the conductors of the electrical cable may carry a voltage of either about 0 VDC or about 12 VDC.

In other embodiments, the FEM may be a hose for carrying a fluid such as air, a purified gas, water, hydraulic fluid, or any other type of fluid, gas or liquid, The hose may be of any size but in some embodiments, the FEM may have an inside diameter of between about 0.1 inch and about 2 inches. In some embodiments, the inside diameter of the hose may be about ¼ inch, about ⅜ inch, about ½ inch, about ⅝ inch, or about ¾ inch. The hose may support any working pressure but in some embodiments, the working pressure of the hose may be between about 5 pounds per square inch (psi) and about 6000 psi. In at least one embodiment, the hose may support a working pressure of at least 200 psi of air. In another embodiment, the hose may support a working pressure of about 3000 psi and be suitable for carrying hydraulic fluid. In another embodiment, the hose may support a working pressure of about 300 psi and be suitable for carrying acetylene gas.

A flexible elongated member (FEM) may have a distal portion that includes a connector 535 that is coupled to the spool 520 and is accessible from the exterior of the spool 520. A proximal portion 531 of the FEM may be coupled to the frame by threading the FEM through the right end 512 of the hollow spindle 510, which is fixed to the frame of the right side support 502 and the left side support 501, and out through the opening 514 in the spindle 510. The middle portion of the FEM, which is the portion of the continuous FEM between the distal portion and the proximal portion 531 of the FEM, is wound as a helix about the spindle 510 and a diameter of the helix changes with rotation of the spool 520.

Another FEM may be coupled to the connector 535 in the extended position of the take-up reel 500A to extend the distal portion of the FEM. As the crank 529 is used to turn the spool 520 counter-clockwise (as viewed from the right side), the other FEM is wound onto the outside surface of the spool 520 and the diameter of the helix 533A formed by the middle portion of the FEM is made smaller to be the helix 533B in the retracted position of the take-up reel 500B.

Some embodiments of the take-up reel 500A/B may be designed so that the FEM does not have any tight bends. The minimum bending radius of the FEM may be controlled by controlling the diameter of the spindle 510, or by the amount of rotation of the spool 520 in the direction to make the helix smaller before something stops the rotation of the spool 520. Care may also be taken in the way that the FEM enters and exits the spool 520. In at least one embodiment, the bending radius of the FEM is not less than about ½ of the diameter of the FEM. In another embodiment, the bending radius of the FEM is not less than the diameter of the FEM.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceeding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. The recitation of numerical ranges by endpoints includes all numbers subsumed within that range (e.g. 1 to 5 includes 1, 2.75, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, 116. In particular the use of "step of" in the claims is not intended to invoke the provision of 35 U.S.C. §112, 116.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments, but should be defined only in accordance with the following claims and equivalents thereof.

What is claimed is:

1. A take-up reel assembly comprising:
   a frame;
   a spindle, having an axis, coupled to the frame;
   a spool positioned coaxially with the spindle and able to rotate about the axis;
   a flexible elongated member having a distal portion coupled to the spool and accessible from exterior of the spool, a middle portion positioned between the spindle and an inside surface of the spool, and a proximal portion coupled to the frame;
   a rotating union including a fixed portion coupled to the frame, and a rotating portion coupled to the spool;
   one or more proximal hoses coupled to the fixed portion of the rotating union; and
   one or more distal hoses coupled to the rotating portion of the rotating union;
   wherein the middle portion of the elongated member is wound as a helix about the spindle and a diameter of the helix changes with rotation of the spool.

2. The take-up reel assembly of claim 1, wherein the flexible elongated member comprises one or more elongated elements, and wherein the one or more elongated elements are chosen from a group consisting of an electrical cable, an optical fiber, and a fluid hose.

3. The take-up reel assembly of claim 2, wherein at least one of the one or more elongated elements is continuous.

4. The take-up reel assembly of claim 1, wherein the middle portion of the flexible elongated member is preformed into a helix.

5. The take-up reel assembly of claim 1, wherein the distal portion of the flexible elongated member is wound on an outside surface of the spool with rotation of the spool.

6. The take-up reel assembly of claim 1, wherein
   the spindle and the spool are fixedly coupled together and the spindle is able to rotate about the axis with the spool, and
   the proximal portion of the flexible elongated member is positioned to enter an inside cavity of the spool from one side of the spool between the spindle and the inside surface of the spool.

7. The take-up reel assembly of claim 1, wherein the spindle is fixedly coupled to the frame and the spool is able to rotate about the spindle.

8. The take-up reel assembly of claim 1, further comprising a sleeve positioned coaxially with the spindle between the spindle and the middle portion of the elongated member, and able to rotate about the spindle.

9. The take-up reel assembly of claim 1, further comprising means for rotating the spool.

10. The take-up reel assembly of claim 1, wherein
    the take-up reel assembly has an extended position and a retracted position;
    the take-up reel assembly is changed from the extended position to the retracted condition by rotating the spool in a first angular direction;
    the take-up reel assembly is changed from the retracted position to the extended position by rotating the spool in an opposite direction of the first angular direction;
    the diameter of the helix formed by the middle portion of the elongated member in the extended position is smaller than the diameter of the helix in the retracted position.

11. The take-up reel assembly of claim 10, further comprising a spring to provide a torque to the spool in the first angular direction.

12. The take-up reel assembly of claim 1, further comprising a guide to position the distal portion of the elongated member on the spool, wherein the guide moves with rotation of the spool.

13. The take-up reel assembly of claim 1, wherein at least a length of the one or more distal hoses is bound to at least a length of the distal portion of the flexible elongated member to create a hybrid elongated member, and the hybrid elongated member is wound on an outside surface of the spool with rotation of the spool.

14. The take-up reel assembly of claim 1, wherein the one or more distal hoses are wound on an outside surface of the spool with rotation of the spool.

15. A take-up reel assembly comprising:
    a frame;
    a spindle, having an axis, coupled to the frame;
    a spool positioned coaxially with the spindle and able to rotate about the axis;
    an electrical cable comprising:
       a proximal portion coupled to the frame and having a near end accessible from outside of the take-up reel assembly,
       a distal portion coupled to the spool and having a far end terminated with an electrical connector, and
       a middle portion, between the proximal and distal portion, wound as a helix about the spindle inside the spool, wherein a diameter of the helix changes with rotation of the spool;
    a two-passage pneumatic rotating union comprising:
       a fixed portion coupled to the frame, and
       a rotating portion coupled to the spool;

two input hoses coupled to the fixed portion of rotating union and having near ends accessible from outside the take-up reel assembly;

two output hoses coupled to rotating portion of the rotating union and having far ends terminated with pneumatic connectors;

a hybrid connection cable comprising the distal portion of the electrical cable and the two or more output hoses bound together;

a guide to position the hybrid connection cable on the spool;

a mechanical linkage between the spool and the guide to move the guide as the spool rotates; and a retraction mechanism to provide a rotational torque to the spool in a first angular direction;

wherein the take-up reel assembly has an extended position where a majority of the hybrid connection cable is extended outside of the take-up reel assembly, and a retracted position where a majority of the hybrid connection cable is wrapped around the spool; and the take-up reel assembly is changed from the extended position to the retracted condition by rotating the spool in the first angular direction.

16. The take-up reel assembly of claim 15, wherein the diameter of the helix formed by the middle portion of the elongated member in the extended position is smaller than the diameter of the helix in the retracted position.

17. The take-up reel assembly of claim 15, wherein the middle portion of the flexible elongated member is preformed into a helix.

18. The take-up reel assembly of claim 15, further comprising a sleeve, positioned coaxially with the spindle, between the spindle and the middle portion of the elongated member, and able to rotate about the spindle.

19. The take-up reel assembly of claim 15, wherein the retraction mechanism comprises a spring.

20. The take-up reel assembly of claim 15, further comprising an air fitting accessible from the exterior of the take-up reel assembly and coupled to one of the two input hoses.

21. The take-up reel assembly of claim 15, wherein the electric cable is compliant with an SAE J2394 specification, the connector is compliant with an SAE J560 specification, the two input hoses and two output hoses have an inside diameter of at least about ¼ inch, support a working pressure of at least 200 pounds per square inch, and are compliant with an SAE J1402 specification, and the pneumatic connectors are compliant with an SAE J318 specification.

22. The take-up reel assembly of claim 15, wherein at least 10 feet of the hybrid connection cable is wrapped around the spool in the retracted position and the hybrid connection cable extends at least 10 feet from the take-up reel assembly in the extended position.

23. The take-up reel assembly of claim 15, wherein a cross-section of the hybrid connection cable has a roughly triangular shape, and the guide comprises three rollers to create a triangular shape for the hybrid connection cable to pass through.

24. A method of coupling a truck to a trailer, the method comprising:

mounting the take-up reel assembly of claim 15 to the truck;

coupling the near ends of the two input hoses to air supplies of the truck;

coupling the near end of the electrical cable to electrical connections of the truck;

extending the hybrid connection cable from the take-up reel assembly;

coupling the electrical connector on the far end of the electrical cable to a mating electrical connector the trailer; and coupling the pneumatic connectors on the far ends of the two output hoses to mating pneumatic connectors on the trailer.

25. A method of coupling a trailer to a moveable wheel assembly, the method comprising:

mounting the take-up reel assembly of claim 15 to the trailer;

coupling the near ends of the two input hoses to air supplies of the trailer;

coupling the near end of the electrical cable to electrical connections of the trailer;

extending the hybrid connection cable from the take-up reel assembly;

coupling the electrical connector on the far end of the electrical cable to a mating electrical connector on the moveable wheel assembly; and coupling the pneumatic connectors on the far ends of the two output hoses mating pneumatic connectors on the moveable wheel assembly.

* * * * *